UNITED STATES PATENT OFFICE.

PASCAL JULES GRANJON, OF MARSEILLE, FRANCE.

COMPOSITION FOR PURIFYING GASES.

1,074,501.　　　　Specification of Letters Patent.　Patented Sept. 30, 1913.

No Drawing.　　Application filed September 7, 1912. Serial No. 719,224.

*To all whom it may concern:*

Be it known that I, PASCAL JULES GRANJON, a citizen of the Republic of France, and a resident of No. 23 Boulevard Kruger, in the city of Marseille, France, have invented a new and useful Improvement in Compositions for Purifying Gases, of which the following is a specification.

The present invention relates to a new process and product, which, though principally intended for the elimination of the phosphoreted hydrogen which is contained in acetylene produced by the double decomposition of carbid of calcium and water, are nevertheless capable of being used for fixing phosphoreted hydrogen, either alone or mixed with other gases.

The principal products known and utilized hitherto for eliminating phosphoreted hydrogen from the gas containing it act as oxidizing agents in that they convert the phosphoreted hydrogen into phosphoric acid, which, not being volatile, remains imprisoned in the mass.

It was natural to think that a salt containing the maximum amount of oxygen, easily reducible to salts containing the minimum quantity of oxygen (in practice, ferric chlorid, acting as oxidizing agent) would easily give up their oxygen to the phosphoreted hydrogen according to the reaction:

$$PH_3 + O_4 = PO_4H_3.$$

This reduction of a "per"-salt into a "proto"-salt only takes place with the requisite intensity under the influence of a catalytic agent, such as, for example, bichlorid of mercury which fixes the phosphoreted hydrogen and is then immediately regenerated by the "per"-salt which passes into a "proto"-salt, so that the bichlorid of mercury can be considered as acting simply by its presence. Unfortunately, the reactions are in reality more complex, and volatile combinations with chlorin are formed and liberated; if the end in view is to purify acetylene these products combine therewith to form gaseous chlorid of acetylene, that is to say a new impurity. This chlorid of acetylene is transformed on combustion into hydrochloric acid, which, in however small a quantity, constitutes a serious disadvantage; involving destruction of gilding, paint-work, tapestry, and being dangerous to health. This drawback is rendered still more serious owing to the fact that the hydrochloric acid is liberated in such small quantities that it is not noticed immediately and is indeed very difficult to perceive, while its injurious action, slow but continued, is not observed until in time it has attained serious proportions.

One of the first improvements suggested was to replace the mixture of ferric chlorid and ferric oxid, originally proposed, by ferric oxychlorid obtained from ferrous chlorid simply exposed to the air on a suitable support as, for example, infusorial earth. This product offers the advantage of providing the chlorid, whose reduction involves the formation of hydrochloric acid, with the oxid capable of absorbing this acid, the chlorid and the oxid being intimately connected, so to speak, molecule to molecule in the exact proportion desired. It also offers the appreciable advantage of being easy to manufacture and of a very moderate net cost. The product prepared in this way realizes complete purification as far as phosphoreted hydrogen is concerned; but although the liberation of hydrochloric acid on combustion of the acetylene is less than before, it is still too great to enable the process to be utilized in practice.

The formation of volatile products containing chlorin is completely hindered by the process forming the subject of the present invention, which consists in adding to the materials, whose bases are ferric chlorids and oxychlorids and bichlorid of mercury, a certain quantity of manganous acid (manganese dioxid, $MnO_2$, obtained by precipitation). This addition does not diminish the purifying power of the material, nor the property it possesses of being able to regenerate itself if exposed to the air. Manganous acid moreover has merely a catalytic action, for a very small amount is sufficient for its action to continue until the material is entirely exhausted. This action can be roughly explained as follows: The phosphoreted hydrogen is oxidized and fixed by the chlorin of the oxychlorid with formation of hydrochloric acid. The latter is decomposed by the manganous acid, chlorin and chlorid of manganese being formed. The chlorid of manganese, by double decomposition with the oxid of the oxychlorid forms ferrous chlorid with regeneration of the manganous acid, whose rôle is thus reduced to action by its presence as a catalytic agent.

The chlorin is fixed by the ferrous chlorid, which is thus partly regenerated, or acts directly to fix, by oxidation, a portion of the phosphoreted hydrogen. This explanation should only be considered as an explanatory sketch in which hypothesis plays a necessary part, as is the case with all phenomena in which catalytic action is present. The final result is alone of importance, namely, the total elimination of the phosphoreted hydrogen without the formation of any volatile product containing chlorin.

It is obvious that other oxids of manganese or of metals of the same family would be able to produce the same result, but manganous acid gives the best results. It must be extremely intimately mixed with the other products constituting the material.

The purifying agent, when ready for use, consists of an intimate mixture of the products mentioned above, more or less diluted with water, generally incorporated in an absorbent support so that the whole is permeable by the gases. The proportions can vary widely according to the end in view.

In order to purify acetylene produced by the action of water on carbid of calcium the following composition by weight may be taken as an example:

| | |
|---|---|
| Ferrous chlorid ($Fe_2Cl_4$) at 40° Baumé | 640 |
| Bichlorid of mercury ($HgCl_2$) | 8 |
| Manganous acid ($MnO_2$, precipitated) | 2 |
| Dry infusorial earth | 350 |
| | 1000 |

In certain cases, if desired, the following composition, by weight, could be used with good results:

| | |
|---|---|
| Ferrous chlorid at 45° Baumé | 600 |
| Precipitated ferric oxid | 90 |
| Bichlorid of mercury | 8 |
| Precipitated manganous acid | 2 |
| Infusorial earth | 300 |
| | 1000 |

The mixture is then exposed to the air, for oxidation, until the reactions characteristic of ferrous salts disappear. The material thus produced is an orange-yellow powder, slightly damp.

When in use, that is, when the material is being employed to purify gases, the ferric salts are transformed into ferrous salts and they can be regenerated, that is, they can be brought back to ferric salts by re-oxidizing them by exposing the mass to the air. This is possible irrespective of the manner in which the product was originally obtained, whether starting directly from a ferric salt or, as in the two examples cited above, from a ferrous salt. At the same time, the oxidation or re-oxidation in the atmosphere of the masses in question takes a long time and is nearly always incomplete. According to this invention, this oxidation or re-oxidation can be greatly accelerated and rendered more complete, so as to render the use of the purifying product more convenient in practice, by adding to the purifying agent a copper salt which, by catalytic action, (acting by its mere presence) insures the desired result being obtained. Copper sulfate appears to be the most suitable salt of copper for the purpose. A very small quantity of copper salt is necessary and a few grams will suffice (sometimes mere traces are enough if well incorporated) per kilogram of the purifying material in order to give the desired effect. In practice, for 1000 parts by weight of the purifying product consisting for example (apart from mercurial catalyzers or others which enter to a slight extent into the composition of the products stated above) of about 600 parts of chlorid or perchlorid of iron, and about 400 parts of infusorial earth, about 25 to 50 parts of sulfate of copper should be added.

By way of example, which is merely indicatory and in no way limitary, the following composition which gives excellent results may be mentioned:

| | |
|---|---|
| Ferrous chlorid ($Fe_2Cl_4$), saturated solution | 585 gr. |
| Crystals of copper sulfate ($CuSO_4$, $5H_2O$) | 28 gr. |
| Bichlorid of mercury ($HgCl_2$) | 8 gr. |
| Manganous acid (precipitated $MnO_2$) | 4 gr. |
| Infusorial earth (free from lime and organic matter) | 375 gr. |
| | 1000 gr. |

The sulfate or other salt of copper can be incorporated with the material at any time, but it is preferable to introduce it in a dissolved state at the moment of manufacture by adding it to the ferrous or ferric chlorid before the liquor is incorporated with the infusorial earth or other porous body used as a supporting medium.

When the materials have been intimately and completely mixed, the mass is exposed to the air until oxidation is finished, which is indicated by the disappearance of the reactions characteristic of ferrous salts. The purifying material is then ready for use.

Different metallic salts and oxids have already been proposed for purifying gases, in particular a mixture of oxid of iron, $Fe_2O_3$ and perchlorid of iron $Fe_2Cl_6$, incorporated in an absorbent material such as infusorial earth is known; the improvement which consists in adding to this mixture a small quantity (1 to 5 per 1,000) of bi-chlorid of mercury as a catalyzing agent is also known, without which the mixture would not absorb the phosphorated hydrogen contained in the acetylene. The iron salts, moreover have another property which is also known: After they have given up their oxygen, they are capable of again absorbing oxygen simply by contact with the atmosphere, so that they can be used again several times as purifying agents, thus rendering the process more economical. All this is known, but in spite of their capacity for absorbing all impurities in acetylene, in spite of their facility to be regenerated, in spite of the advantage which they offer of being of a low cost,—all similar mixtures have been speedily abandoned after trial for the two reasons heretofore stated, namely: (1) Formation of volatile products containing chlorin. (2) The difficulty of obtaining complete oxidation by the air.

Applicant's invention is limited essentially to the use of a composition which is not subject to these particular drawbacks, this composition being characterized by the addition to the known mixture of two products, namely: manganous acid, in order to prevent the formation of volatile products containing chlorin, and sulfate of copper for the purpose of rendering oxidation in the air more rapid and more complete.

Only hypotheses can be made relative to the chemical reactions which give the results indicated above. As far as manganous acid is concerned, it can be assumed that it acts during the purifying, or that its rôle, terminated at the moment of purifying, consists in modifying the molecular constitution of certain elements of the mixture. This is of little importance as it is only the results which are of interest.

It is certain that the product which is obtained by the present invention has a number of properties which give it the character of a new invention and that the rôle of the copper salt and of the manganous acid is quite different from that heretofore known.

It will be obvious that the proportions indicated above of the various ingredients can be varied to a certain extent according to the end in view.

I claim:

1. A composition for purifying gases comprising metallic oxids and chlorids, bichlorid of mercury, and a porous permeable supporting agent in substantially the proportions set forth, with the addition of a relatively small quantity of manganous acid (hydrated dioxid of manganese obtained chemically) acting as catalyzing agent.

2. A composition for purifying gases, comprising metallic oxids and chlorids, bichlorid of mercury, and a porous permeable supporting agent in substantially the proportions set forth, with the addition of a relatively small quantity of an easily reducible oxid of manganese acting as catalyzing agent.

3. A composition for purifying gases comprising metallic oxids and chlorids, bichlorid of mercury, and a porous permeable supporting agent in substantially the proportions set forth, with the addition of a relatively small quantity of manganous acid and of a relatively small quantity of a copper salt.

4. A composition for purifying gases comprising oxids and chlorids of iron, bichlorid of mercury, and a porous permeable supporting agent in substantially the proportions set forth, with the addition of a relatively small quantity of manganous acid (hydrated dioxid of manganese obtained chemically) acting as catalyzing agent.

5. A composition for purifying gases, comprising oxids and chlorids of iron, bichlorid of mercury, and a porous permeable supporting agent in substantially the proportions set forth, with the addition of a relatively small quantity of an easily reducible oxid of manganese acting as catalyzing agent.

6. A composition for purifying gases comprising oxids and chlorids of iron; bichlorid of mercury, and a porous permeable supporting agent in substantially the proportions set forth, with the addition of a relatively small quantity of manganous acid, and of a relatively small quantity of a copper salt.

In witness whereof I have hereunto set my hand this 25th day of August 1912 in presence of two subscribing witnesses.

PASCAL JULES GRANJON.

Witnesses:
ANTOINE AMBROSINI,
PAUL LAFOREST.